(12) United States Patent (10) Patent No.: US 8,379,538 B2
Rolia et al. (45) Date of Patent: *Feb. 19, 2013

(54) MODEL-DRIVEN MONITORING ARCHITECTURE

(75) Inventors: Jerome Rolia, Kanata (CA); Keith I. Farkas, San Carlos, CA (US); Martin F. Arlitt, Calgary (CA); Sven Graupner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2296 days.

This patent is subject to a terminal disclaimer.

(21) Appl. No.: 11/158,756

(22) Filed: Jun. 22, 2005

(65) Prior Publication Data

US 2006/0294439 A1 Dec. 28, 2006

(51) Int. Cl.
*H04L 12/28* (2006.01)
*G06F 15/177* (2006.01)

(52) U.S. Cl. .................... 370/254; 709/220; 709/224

(58) Field of Classification Search .............. 370/241, 370/252, 254; 709/201, 220, 221, 223, 224
See application file for complete search history.

(56) References Cited

U.S. PATENT DOCUMENTS

| | | | |
|---|---|---|---|
| 3,283,304 A | 11/1966 | Sinn et al. | |
| 3,516,063 A | 6/1970 | Arkin et al. | |
| 3,516,072 A | 6/1970 | Wallace, Jr. | |
| 3,541,513 A | 11/1970 | Patterson | |
| 3,623,158 A | 11/1971 | Liewelyn et al. | |
| 4,057,847 A | 11/1977 | Lowell et al. | |
| 4,227,245 A | 10/1980 | Edblad et al. | |
| T0104003 I4 | 3/1984 | Hall et al. | |
| 4,812,996 A | 3/1989 | Stubbs | |
| 5,206,812 A | 4/1993 | Abumehdi | |
| 5,504,922 A | 4/1996 | Seki et al. | |
| 5,619,654 A | 4/1997 | Mukai et al. | |
| 5,841,975 A | 11/1998 | Layne et al. | |
| 6,571,201 B1 | 5/2003 | Royal et al. | |
| 6,978,301 B2* | 12/2005 | Tindal | 709/223 |
| 7,054,946 B2* | 5/2006 | Tindal et al. | 709/232 |
| 7,251,588 B2 | 7/2007 | Graupner et al. | |
| 7,403,988 B1* | 7/2008 | Blouin et al. | 709/223 |
| 7,475,080 B2* | 1/2009 | Chowdbary et al. | 1/1 |
| 7,849,171 B2* | 12/2010 | Motoyama et al. | 709/223 |
| 7,865,344 B2* | 1/2011 | Wozniak | 703/13 |
| 7,865,888 B1* | 1/2011 | Qureshi et al. | 717/168 |
| 7,933,226 B2* | 4/2011 | Woodruff et al. | 370/260 |
| 2003/0204377 A1 | 10/2003 | Royal et al. | |
| 2004/0216139 A1 | 10/2004 | Rhoda et al. | |
| 2005/0198040 A1* | 9/2005 | Cohen et al. | 707/10 |
| 2006/0015602 A1 | 1/2006 | Inoue et al. | |

(Continued)

FOREIGN PATENT DOCUMENTS

EP 0278163 8/1988

OTHER PUBLICATIONS

Carney, D. et al., "Monitoring Streams—A New Class of Data Management Applications", in Brown Computer Science Technical Report, TR-CS-02-04, pp. 0-13.

(Continued)

*Primary Examiner* — Kerri Rose

(57) ABSTRACT

According to one embodiment of the present invention, a method comprises providing a machine-readable monitoring model that maintains configuration of a monitoring environment. An element of the monitoring environment reads the machine-readable monitoring model and adapts its operation to the configuration defined thereby.

21 Claims, 3 Drawing Sheets

U.S. PATENT DOCUMENTS

| | | | | |
|---|---|---|---|---|
| 2006/0019679 | A1* | 1/2006 | Rappaport et al. | 455/456.5 |
| 2006/0294221 | A1 | 12/2006 | Graupner et al. | |
| 2006/0294439 | A1 | 12/2006 | Rolia et al. | |
| 2007/0003023 | A1 | 1/2007 | Rolia | |
| 2007/0005302 | A1 | 1/2007 | Graupner et al. | |
| 2007/0011299 | A1 | 1/2007 | Farkas et al. | |

OTHER PUBLICATIONS

Ciuffoletti, A. et al., "Architecture of Monitoring Elements for the Network Element Modeling in a Grid Infrastructure", presented in Computing in High Energy Physics, La Jolla, California Mar. 24-28, 2003, pp. 1-4.

Configuring Metric Collection for z/OS Systems, Tivoli Software, [online] [Retrieved on Sep. 14, 2005] Retrieved from: http://publib.boulder.ibm.com/tividd/tdITMWI/SC23-4705-02/en_US/HTML/wasugmst39.htm, pp. 1-3.

U.S. Appl. No. 11/158,868, Office Action dated Jul. 24, 2006, pp. 1-9.

U.S. Appl. No. 11/158,868, Office Action dated Dec. 11, 2006, pp. 1-11.

U.S. Appl. No. 11/158,868, Notice of Allowance and Fee(s) Due, dated May 30, 2007, pp. 1-10.

U.S. Appl. No. 11/158,776, Office Action dated Oct. 30, 2007, pp. 1-15 and attachments.

U.S. Appl. No. 11/158,776, Final Rejection dated Apr. 4, 2008, pp. 1-16 and attachments.

U.S. Appl. No. 11/158,776, Examiner's Answer dated Nov. 10, 2008, pp. 1-32.

U.S. Appl. No. 11/158,776, BPAI Decision (Affirmed) dated Apr. 27, 2011, pp. 1-12.

U.S. Appl. No. 11/158,776, Office Action dated Aug. 16, 2011, pp. 1-27.

* cited by examiner

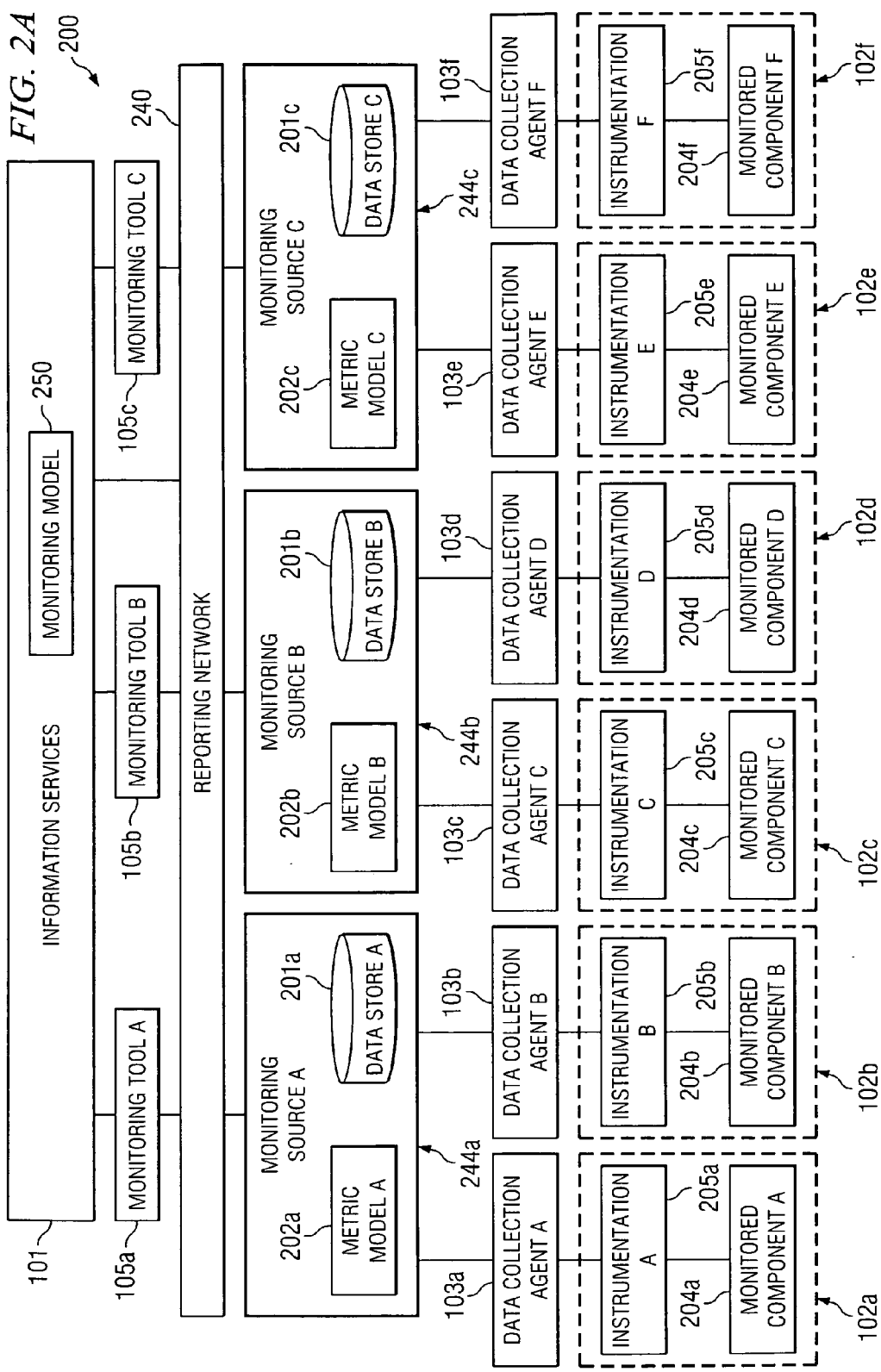

MODEL-DRIVEN MONITORING ARCHITECTURE

CROSS-REFERENCE TO RELATED APPLICATIONS

This application is related to concurrently filed and commonly assigned U.S. patent application Ser. Nos. 158,776 entitled "SYSTEM AND METHOD FOR AUTONOMOUSLY CONFIGURING A REPORTING NETWORK"; 11/158,868 entitled "SYSTEM FOR METRIC INTROSPECTION IN MONITORING SOURCES"; 11/158,777 entitled "SYSTEM FOR PROGRAMMATIC ALLY CONTROLLING MEASUREMENTS IN MONITORING SOURCES"; and 11/158,376 entitled "SYSTEM AND METHOD FOR USING MACHINE-READABLE META-MODELS FOR INTERPRETING DATA MODELS IN A COMPUTING ENVIRONMENT", the disclosures of which are hereby incorporated herein by reference.

FIELD OF THE INVENTION

The following description relates in general to monitoring systems, and more particularly to systems and methods for providing machine-readable monitoring model for use in enabling elements of a monitoring system to recognize configuration changes in the system being monitored and autonomously adapt thereto.

DESCRIPTION OF RELATED ART

Computing systems of various types are widely employed today. Data centers, grid environments, servers, routers, switches, personal computers (PCs), laptop computers, workstations, devices, handhelds, sensors, and various other types of information processing devices are relied upon for performance of tasks. Monitoring environments are also often employed to monitor these computing systems. For instance, monitoring environments may be employed to observe whether a monitored computing system is functioning properly (or at all), the amount of utilization of resources of such monitored computing system (e.g., CPU utilization, memory utilization, I/O utilization, etc.), and/or other aspects of the monitored computing system.

In general, monitoring instrumentation (e.g., software and/or hardware) is often employed at the monitored system to collect information, such as information regarding utilization of its resources, etc. The collected information, which may be referred to as "raw metric data," may be stored to a data store (e.g., database or other suitable data structure) that is either local to or remote from the monitored computing system, and monitoring tools may then access the stored information to provide services. The monitoring data may be pushed to a monitoring tool and/or a monitoring tool may request (or "pull") the monitoring data from a monitoring source. In some instances, tasks may be triggered by the monitoring tools based on the monitoring data it receives. For example, a monitoring tool may generate utilization charts to display to a user the amount of utilization of resources of a monitored system over a period of time. As another example, alerts may be generated by the monitoring tool to alert a user to a problem with the monitored computing system (e.g., that the computing system is failing to respond). As still another example, the monitoring tool may take action to re-balance workloads among various monitored computing systems (e.g., nodes of a cluster) based on the utilization information observed for each monitored computing system.

Today, monitoring data is collected in the form of metrics that are defined and observed for a monitored computing system. In general, instrumentation and/or monitoring sources are typically configured to collect and/or report various metrics for a given monitored computing system. An example of an existing monitoring architecture is as supported by Hewlett-Packard's OpenView Reporter product. As described further below, such traditional monitoring architectures require manual configuration for monitoring a monitored environment, and changes in the monitoring environment require manual re-configuration. For instance, changes that have traditionally required manual re-configuration of the monitoring environment include adding a metric to the set of metrics available for a monitored component, and moving an application from one virtualization abstraction to another (e.g., a virtual machine to a virtual partition, wherein metric names change), as examples. As a further example, the well known system activity reporter (sar) has changed file formats with the open source operating system Linux a number of times, and as a result the "delivery" fails when the collectors are upgraded, as the delivery infrastructure can no longer read the files.

In general, traditional monitoring architectures (or "infrastructures") provide data collection agents that interact with instrumentation systems. These agents typically provide for the movement of monitoring data to statically configured monitoring data repositories that pre-suppose the identity of metrics and the topology and configuration of the monitored environment. Data consumer applications (or "monitoring tools") become coupled with such repositories. That is, a monitoring tool communicatively accesses the repositories (or "monitoring data stores") of a data collection agent to receive desired monitoring data. The monitoring data repositories typically have schemas that pre-suppose the metrics to be reported and detailed information about the monitored environment. The schemas do not tolerate changes in infrastructure, but rather they must be maintained by a user to support such changes. In turn, data consumer applications ("monitoring tools") must also be maintained by users to support the changes. For example, if one instrumentation system coupled to a monitored component within a monitoring environment is replaced with another instrumentation system that reports similar metrics for the monitored component but with different names for such metrics, traditionally this requires administrative maintenance for data repositories and data consumer applications. That is, a user must manually reconfigure the monitoring source's data repositories and/or consumer applications (monitoring tools) to recognize the new names of the metrics collected by the new instrumentation system. As another example, the new instrumentation system may collect different metrics. For instance, a first instrumentation system may collect data for a "memory utilization" metric as a percentage of utilization of the monitored component's memory, while a second instrumentation system may collect data for the "memory utilization" metric in different units, such as in Kbytes used. As still another example, the new instrumentation system may collect measurements with different frequency, e.g., 60 second intervals instead of 5 minute intervals. Thus, traditionally a user is required to manually reconfigure various elements of the monitoring environment, such as data stores for data collection agents and/or monitoring tools, to account for any changes made in the instrumentation of the monitored environment.

Further, networks that are used to forward monitoring data from a monitored component to a data consumer (monitoring tool) in traditional monitoring architectures are not sensitive to the behavior or configuration of the underlying infrastructure of the monitored environment. For example, a network link may have a dynamically varying capacity (which at times may be 0) or may be subject to significantly different loads at various times, and the reporting networks of traditional monitoring environments are not sensitive to the impact of monitoring on the environments being monitored. So, the communication of monitoring data may negatively impact the performance of the underlying monitored environment. For instance, the reporting network may consume valuable bandwidth during a time in which such bandwidth is desperately needed for the underlying monitored environment.

Thus, traditional monitoring solutions have required manual reconfiguration of the monitoring environment responsive to changes in the monitored environment. In many monitored environments, changes occur relatively seldom and thus such a manual reconfiguration may not be overly burdensome, although often still undesirable. However, many monitoring environments encounter changes much more often. Further, these changes are increasingly difficult due to the increasing complexity of monitored environments. For instance, in a data center environment, applications (and/or other monitored components) may dynamically move from one data center to another (e.g., for load-balancing purposes, etc.) or may simply move within a data center. Accordingly, traditional monitoring infrastructures that require such manual reconfiguration responsive to changes in the underlying monitored environment are undesirably inefficient and inflexible. Further, manual reconfiguration is undesirable because the need for reconfiguration may not be noticed until the data is needed, at which time the data may have been lost (i.e., data collection may have stopped from the time the change occurred until the time the problem requiring data for diagnosis is detected).

BRIEF DESCRIPTION OF THE DRAWINGS

FIG. 2A shows an exemplary system implemented in accordance with the model-driven monitoring architecture of FIG. 1;

DETAILED DESCRIPTION

Embodiments of the present invention provide a model-driven monitoring architecture that is capable of autonomously (without requiring user interaction/re-configuration) adapting to changes in the monitored environment. In certain embodiments, a machine-readable monitoring model is provided that describes/models the configuration of a monitoring or monitored environment so that when changes occur in the configuration of the monitoring environment, the monitoring model is modified to enable components within the monitoring environment to autonomously adapt to the changes without requiring a user to manually re-configure those components. A "monitoring environment" is a system and refers to an instance of the model-driven monitoring architecture, while a monitored environment refers to system that is being monitored. The configuration of a monitoring environment may change from time-to-time due to changes in the monitored or monitoring environments, resulting in different instances of the model-driven architecture. In this sense, the "configuration" of a monitoring environment refers to such aspects as the metric model according to which monitoring data is collected at a data collection agent and topology of the monitoring environment (describing interrelationships between such components as data consumers, data collection agents, metric meta-models, metric models, and a reporting network, as examples). In general, the configuration of the monitoring environment refers to anything that affects the ability of a monitoring tool having a relationship with one or more data collection agents to be capable of receiving and understanding monitoring data that the monitoring tool desires for monitored component(s). As mentioned above, examples of such configuration information include understanding the metric model used by a data collection agent and the topology of interrelationships between elements of the monitoring environment.

Thus, according to the exemplary embodiments of the present invention described further below, a machine-readable monitoring model is provided that enables elements of a monitoring system to autonomously discover and adapt to changes in configuration of the monitoring environment and monitored environment such as changes in metric models and/or changes in the topology of the monitored environment. Thus, embodiments of the present invention maintain a machine-readable monitoring model that defines the configuration of a monitoring environment including its relationship to the monitored environment and monitoring tools that make use of monitoring data. Such machine-readable "configuration" is described further below.

Figure 1:
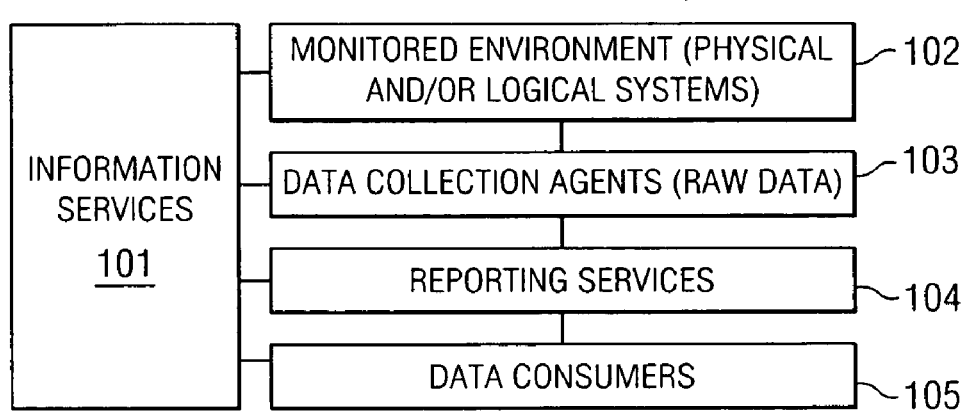
FIG. 1 shows a block diagram representing an exemplary model-driven monitoring architecture according to one embodiment of the present invention.

FIG. 1 shows a block diagram representing an exemplary model-driven monitoring architecture 100 according to one embodiment of the present invention. Model-driven monitoring architecture 100 includes information service block 101, monitored environment 102, data collection agents 103, reporting services 104, and data consumers 105.

As described further below, the model-driven monitoring architecture 100 improves efficiency and reliability of the monitoring because it is capable of autonomously adapting to changes occurring in the monitored environment. That is, a user is not required to manually re-configure data collection agents and/or monitoring tools to account for changes occurring in the underlying monitored environment, as with traditional monitoring architectures, but instead the model-driven architecture enables the data collection agents and/or monitoring tools to autonomously adapt to changes in the monitored environment. Various other features/advantages of embodiments of the present invention are described further below.

As described further herein, monitoring architecture 100 supports the collection, correlation, and reporting of monitoring data about physical and logical systems of a dynamically changing monitored environment 102. Monitoring data collected from the monitored environment 102 may include measurements and/or events for, as examples, computing, networking, storage system, environmental system, application, and/or business-related aspects of the monitored environment 102. Physical and logical systems of the monitored environment 102 have existing instrumentation systems to gather the monitoring data. Data collection agents 103 interact with instrumentation systems and expose them to the model-driven monitoring architecture. As described further herein, data collection agents 103 may enable the control of the instrumentation systems. For example, data collection agents 103 may enable selection of metrics, reporting frequencies, and/or qualities to be provided by the instrumentation systems. In certain embodiments, the data collection agents 103 accept data from the instrumentation systems in the monitored environment 102 and make such data available to the rest of the model-driven monitoring architecture 100.

Data consumers 105 may be humans, agents, and/or tools that desire monitoring data. Data consumers 105 may desire monitoring data with certain qualities, such as at certain rates, certain resolutions, or with limits on overhead. The consumers 105 may desire that data about monitored environment 102 be correlated based on common metrics, including measurement time. In accordance with certain embodiments of the present invention, data consumers 105 need not be aware of how they are connected to the underlying instrumentation systems of monitored environment 102.

Reporting services 104 are aware of the joint monitoring desires of data consumers 105 and the capabilities of data collection agents 103. Reporting services 104 may provide an overlay network that gathers, stores, provides value added processing and/or correlates monitoring data received from the data collection agents 103, such as the exemplary overlay network described in co-pending and commonly assigned U.S. patent application 11/158,776, titled "SYSTEM AND METHOD FOR AUTONOMOUSLY CONFIGURING A REPORTING NETWORK", the disclosure of which is hereby incorporated herein by reference. Reporting services 104 makes such monitoring data available, via the overlay network, to the consumers 105. In certain embodiments, reporting services 104 may provide value added processing such as translating metrics or units to common or "standard" metrics or deriving new metrics based on other metrics. Accordingly, this decouples the metric description from the specific implementations or unique naming conventions of particular instrumentation systems present in the underlying monitored environment 102.

Figure 2B:
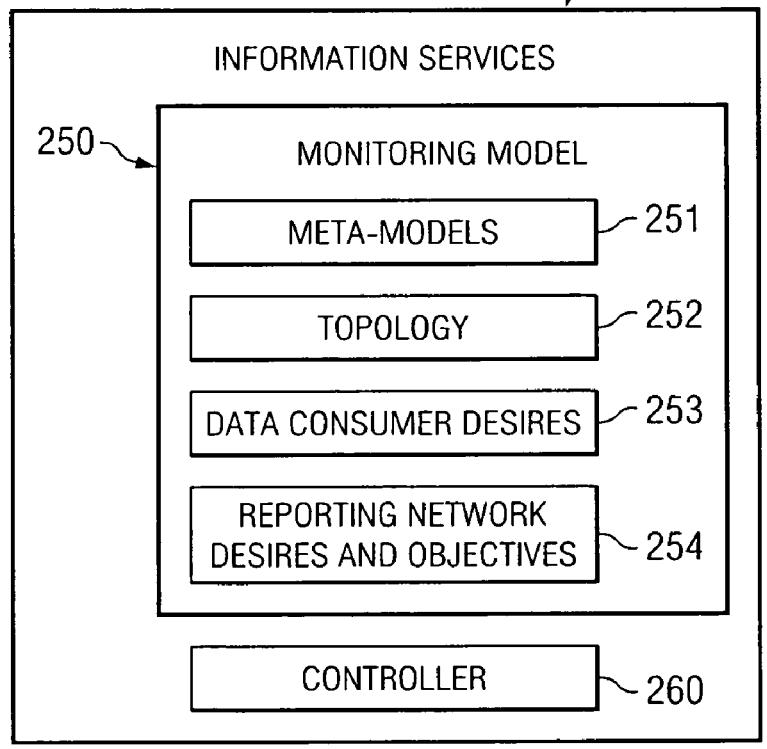
FIG. 2B shows an exemplary monitoring model that may be implemented by the information services of FIG. 2A in accordance with one embodiment.

In certain embodiments, reporting services 104 are aware of the ongoing behavior of the overlay network, and the reporting services operate to achieve the qualities desired by data consumers 105 and/or qualities and desires or objectives 254 (as shown in FIG. 2B discussed below) specified for the data reporting services as a whole. In certain embodiments, reporting services 104 may reconfigure the overlay network or provide information to facilitate the self-reconfiguration of the overlay network based on changes in data consumer desires 253 (FIG. 2B), data collector availability, the behavior or topology of the systems that support the overlay network, desires for the reporting services as a whole 254, or other events, as described further in the exemplary embodiments of co-pending U.S. patent application Ser. No. 11/158,776 titled "SYSTEM AND METHOD FOR AUTONOMOUSLY CONFIGURING A REPORTING NETWORK". The aggregate desires of data consumers 105 govern the configuration and control of the reporting services 104, in certain embodiments. Reporting services 104 may convey configuration and control information to data collection agents 103 to govern the collection of monitoring data from the underlying monitored environment 102. Similarly, reporting services 104 may convey metric model, meta-model, and contextually classifying meta-data from data collection agents 103 or other monitoring sources to the metric model of the information service 101.

Information service 101 provides support for dynamism and indirection. According to certain embodiments of the present invention, information service 101 maintains information about data collection agents for the physical and logical systems in the monitored environment. Information service 101 maintains information from which the relationships between these systems, their data collection agents 103, the reporting services 104, and the data consumers 105 may be determined. In certain embodiments, this information is captured and monitored in a machine-readable "monitoring model." Thus, the information service 101 enables data consumers 105 to discover information about the systems of the monitored environment 102. For example, in certain embodiments a data consumer 105 can, by perusing a machine-readable model, discover the structure and relationships in the monitoring environment and the monitored environment 102. The consumers 105 can discover which monitored components exist in the monitored environment 102 and which metric models are available from data collection agents 103 for each monitored component in the monitored environment 102. The data consumers 105 can be made aware of changes in such relationships or availabilities via events, for example. In certain embodiments, information service 101 includes a meta-model service that provide for common or standard semantics for interpreting models and metrics, such as in the exemplary embodiments disclosed in co-pending U.S. patent application Ser. No. 11/158,376 titled "SYSTEM AND METHOD FOR USING MACHINE-READABLE META-MODELS FOR INTERPRETING DATA MODELS IN A COMPUTING ENVIRONMENT". Furthermore, in certain embodiments, meta-data may be used in the monitoring model help classify the purpose of systems (e.g., payroll, accounts payable, etc.) in the monitored environment. For greatest advantage, such meta-data is understood in a common manner throughout the monitored system and monitoring system. In an embodiment, the meta-data corresponds to a meta-model for interpreting such meta-data.

FIG. 2A shows an exemplary monitoring environment 200 implemented in accordance with the model-driven monitoring architecture of FIG. 1. System 200 comprises monitored environments 102A-102F (referred to collectively as monitored environment 102) that comprise monitored components 204A-204F (referred to collectively as monitored components 204), respectively. Monitored components 204A-204F have associated therewith monitoring instrumentation 205A-205F (referred to collectively as monitoring instrumentation 205), respectively, for collecting monitoring data. For instance, as is well-known in the art, monitoring instrumentation 205 may comprise hardware and/or software for collecting information about a corresponding monitored component 204, which may also be referred to herein as a "monitored computing system." Each monitored component 204 may comprise any type of monitored computing system, such as a data center, grid environment, server, router, switch, personal computer (PC), laptop computer, workstation, devices, handhelds, sensors, or any other information processing device or application executing on such device. While six monitored components 204 and associated monitoring instrumentation 205 are shown in the exemplary system 200, embodiments of the present invention may be employed for any number of monitored components and monitoring instrumentation.

System 200 further includes data collection agents 103A-103F (referred to collectively as data collection agents 103), which are each operable to interact with their respective instrumentation systems 205 and expose the instrumentation systems to the model-driven monitoring architecture, as described further herein. In certain embodiments, for instance, data collection agents 103 enable control of the instrumentation systems 205 by selecting metrics, reporting frequencies, and/or qualities to be provided by the instrumentation systems 205. Further, the data collection agents 103 accept data from their respective instrumentation systems 205 and make such data available to the rest of the model-driven monitoring architecture via monitoring sources 104A-104C, as described further below.

Monitoring sources 244A-244C (referred to collectively as monitoring sources 244) are further included in exemplary system 200 and are the data source for reporting services 104 described above in FIG. 1. In general, a monitoring source 244 is a component that gathers or stores monitoring data about monitored components, such as monitored components 204, in an environment. Monitoring sources commonly include a monitoring data store for storing monitoring data collected for monitored component(s) 204. In the example of FIG. 2A, monitoring source 244A includes data store 201A for storing monitoring data collected for monitored components 204A-204B; monitoring source 244B includes data store 201B for storing monitoring data collected for monitored component 204C; and monitoring source 244C includes data store 201C for storing monitoring data collected for monitored components 204E-204F. Data stores 201A-201C are referred to collectively as data stores 201. Such data stores 201 may each comprise any suitable form of computer-readable storage medium, such as memory (e.g., RAM), a hard drive, optical disk, floppy disk, tape drive, etc., and may each store their respective monitoring data in the form of a database or any other suitable data structure. In certain implementations, a given monitoring data store 201 may store monitoring data for a plurality of different monitored components 204. In certain embodiments, the monitoring data is communicated from monitoring instrumentation 205 and/or data collection agents 103 to monitoring data stores 201 via a communication network (not shown), such as the Internet or other wide-area network (WAN), a local area network (LAN), a telephony network, a wireless network, or any other communication network that enables two or more information processing devices to communicate data. The monitoring data stored therein may comprise any number of metrics collected for monitored component(s) 204, such as CPU utilization, memory utilization, I/O utilization, etc. The monitoring sources 244 may also include metric introspection interfaces, which enable the information services 101 to access these metric definitions and which is described further in the exemplary embodiments of co-pending U.S. patent application Ser. No. 11/158,868 titled "SYSTEM FOR METRIC INTROSPECTION IN MONITORING SOURCES". The monitoring sources 244 communicate with the data consumers using reporting network 240 which is described further in the exemplary embodiments of co-pending U.S. patent application Ser. No. 11/158,776 titled "SYSTEM AND METHOD FOR AUTONOMOUSLY CONFIGURING A REPORTING NETWORK".

Monitoring tools (or "data consumers") 105A-105C (referred to collectively as monitoring tools 105) are further implemented in system 200, which are each operable to access (e.g., via a communication network) the collected monitoring data in one or more of monitoring data stores 201. In the specific example shown in FIG. 2A, monitoring tool 105A is communicatively coupled to monitoring sources 244A and 244B via the reporting network; monitoring tool 105B is communicatively coupled to monitoring sources 244A-244C via the reporting network; and monitoring tool 105C is communicatively coupled to monitoring source 244C via reporting network 240. As used herein, a "monitoring tool" refers to any device that is operable to access the collected monitoring data for at least one monitored component 204. A monitoring tool 105 may comprise a server, PC, laptop, or other suitable information processing device, which may have one or more software applications executing thereon for accessing the monitoring data in monitoring data stores 201 for one or more monitored components 204. A monitoring tool 105 may be implemented to pull (e.g., request) monitoring data from one or more monitoring sources 244 and/or monitoring tool 105 may, in some instances, receive monitoring data that is pushed from one or more monitoring sources 244 to such monitoring tool 105. Monitoring tools 105 may be implemented, for example, to take responsive actions based on the received monitoring data.

In the exemplary system of FIG. 2A, monitoring sources 244A-244C further include machine-readable metric models 202A-202C (referred to collectively herein as metric models 202), respectively. Metric models 202 specify the monitoring data that is available via their respective data collection agents 103. Data collection agents 103 inform related monitoring sources 244 when their metric models become available, change, or become unavailable. As described further in co-pending U.S. patent application Ser. No. 11/158,376 titled "SYSTEM AND METHOD FOR USING MACHINE-READABLE META-MODELS FOR INTERPRETING DATA MODELS IN A COMPUTING ENVIRONMENT", metric models 202 define the monitoring data stored at the monitoring sources 202. Thus, in certain embodiments, the monitoring data stored to monitoring data store 201A is configured in accordance with metric model 202A; the monitoring data stored to monitoring data store 201B is configured in accordance with metric model 202B; and the monitoring data stored to monitoring data store 201C is configured in accordance with metric model 202C.

Information services 101 is further included in system 200, which may be accessible by each of the monitoring tools and/or other components in the monitoring system. Information service 101 provides support for dynamism and indirection. As described further below with FIG. 2B, information service 101 maintains a machine-readable model 250 of the overall monitoring system. In certain embodiments, the machine-readable monitoring model 250 describes the configuration of a monitoring system so that when changes occur in the configuration of the monitoring or monitored systems the model is modified to enable components within the monitoring system to autonomously adapt to the changes without requiring a user to manually re-configure those components in the monitoring system. Such machine-readable monitoring model may include such configuration information as meta-models that define corresponding metric models (e.g., metric models 202 of FIG. 2A) used in the monitoring system and/or topology information describing the interrelationship of elements in the monitoring system (e.g., relationship between data consumers and monitoring sources from which the data consumers consume monitoring data, and relationship between metric models describing the monitoring data available at a given monitoring source and a corresponding meta-model defining the structure (e.g., syntax) of the metric model, and meta-data). As the configuration of the monitoring system changes over time, such as the metric model(s) of a monitoring source, and/or requirements for data by monitoring tool(s) and/or desires and objectives for the reporting network and/or monitoring source(s) changing, the information service 101 updates its monitoring model to reflect these configuration changes. Elements of the monitoring environment, such as the monitoring tools, monitoring sources, etc., can thus access the information service 101 to autonomously update information (e.g., requirements for specific monitoring data as described by specific metric models that conform to specific meta-models with context information described by specific meta-data that are available from specific monitoring sources for specific monitored components, the capability to provide data for specific metric models that conform to specific meta-models with context information described by specific meta-data for specific monitored components) that causes changes to the model, be informed of changes to the model that may affect them, and determine, based on the monitoring model, changes occurring in the configuration of the monitoring system and adapt thereto.

Thus, the monitoring model of certain embodiments provides machine-readable information about the configuration of a monitoring system (e.g., topology and interrelationships of elements of the monitored environment and/or meta-models defining structure of metric models used in the monitoring environment with meta-data that characterizes the context of the information). The monitoring model maintained by information service 101 keeps track of this configuration information. Thus, the information service 101 enables monitoring tools 105 (and/or other elements of the monitoring architecture) to discover, via the machine-readable monitoring model, information about the configuration of the monitoring environment even as such configuration may change (e.g., responsive to changes in the monitored environment) and information about requirement for monitoring data and capabilities to offer monitoring data.

Turning to FIG. 2B, an exemplary monitoring model 250 that may be implemented by information services 101 of FIG. 2A in accordance with one embodiment is represented in block-diagram form. As shown, monitoring model 250 maintains configuration information, including meta-model(s) 251 for the metric models (e.g., metric models 202A-202C of FIG. 2A) included in the monitoring environment, topology information 252 describing the relationships of the elements of the monitoring architecture, data consumer desires 253 such as a statement of monitoring data that is needed by a monitoring tool along with requirements such as reporting frequency, and reporting network desires and objectives 254 such as the goal to minimize wide area network resource usage and the selection of a value added service that gives data forwarding priority to data that supports administrative tools over data that supports end-user tools. The machine-readable metric meta-model(s) 251 define the structure (e.g., syntax) used by corresponding metric models 202, as described further in co-pending and commonly assigned U.S. patent application Ser. No. 11/158,376 titled "SYSTEM AND METHOD FOR USING MACHINE-READABLE META-MODELS FOR INTERPRETING DATA MODELS IN A COMPUTING ENVIRONMENT", the disclosure of which is hereby incorporated herein by reference. As such, a monitoring tool 105 can access metric meta-models 251 and thus determine the structure of the corresponding metric model(s) 202. As such, the monitoring tools 105 can dynamically adapt and understand the monitoring data of different monitoring sources 244 which are structured according to different metric models 202 (by accessing the corresponding machine-readable meta-model 251 on which each metric model 202 is based), rather than monitoring tool 105 being required to be manually hard-coded to recognize the structure of each metric model 202.

In general, the meta-models 251 support introspection such that components can programmatically comprehend the metric models and adapt to changes in such metric models. The metric model instrumentation/control interfaces as exposed via the monitoring sources can be used to manipulate the monitoring sources programmatically to, as examples, discover what they monitor, control what they monitor, and/or register for events that describe when there are changes to the monitored environment that would affect the information service. The reporting network may be used to communicate monitoring data from instrumentation to a data consumer (e.g., via a monitoring source) and provide value added services such as deriving new metrics from the collected monitoring data. As conditions change in the network, the network may reconfigure, such as described in the exemplary embodiments of co-pending and commonly assigned U.S. patent application Ser. No. 11/158,776 titled "SYSTEM AND METHOD FOR AUTONOMOUSLY CONFIGURING A REPORTING NETWORK", the disclosure of which is hereby incorporated herein by reference. Information service controller 260 may be used to command the reconfiguration of such a reporting network.

According to one embodiment, as data collection agents/monitoring tools enter and leave the monitoring environment they register/de-register with the information service 101 to connect/disconnect, respectively, with the reporting network. For example, a data collection agent becomes bound to a monitoring source that is connected to the reporting network. These entry and departure activities, combined with dynamic changes in the reporting network, cause the reporting network to be reconfigured over time. The reporting network is configured to satisfy desires and objectives for the reporting network 254. These may include minimizing the use of wide area network bandwidth and/or satisfying latency requirements for the forwarding of information while satisfying the monitoring data requirements of the monitoring tools. The reporting network may be an overlay network that is structured as a uni-cast or multi-cast network, or other networking configuration pattern. Standard algorithms for managing these network configurations may be employed to the advantage of achieving objectives for the reporting network.

As changes take place within monitored environments, lifecycle events that describe these changes, can be submitted to the information service 101 by either the monitoring sources or other tools (e.g., a resource assignment service). The information that describes the changes may include, for example, metric models, meta-models, meta-data, or requirements for data. This information is used by the information service to update its monitoring model so that the monitoring model accurately reflects what may be monitored in the monitored environment. Other tools can register for such events (via expression of interest based on meta-data, e.g., interested in all components related to the payroll system) and upon reception initiate changes to their monitoring requirements 253 (e.g., need to acquire monitoring information for an additional monitored component or from another source). The requirement changes may then also cause the monitoring model to be updated 250. These changes may, in turn, cause the reporting network 240 to be reconfigured.

Information service 101 may update its monitoring model in response to received "change events". Change events may be provided to information service 101 from monitoring sources or from other agents/tools within the monitoring architecture, such as a tool that causes an application to move from one monitored environment to another.

In one embodiment, a tool is built on top of the information service 101 that keeps track of changes in a monitored environment, wherein the environment's monitoring sources would report events to the information service when changes occur in the monitored environment and information from these events can be propagated to the tool which then logs them for visualization and further analysis.

In the embodiment shown in FIG. 2A, the monitoring tools 105 query the information services 101 for the topology 252

(FIG. 2B) and the meta-models 251 (FIG. 2B). It is important to maintain the consistency of the topology and meta-model information. There are numerous methods for providing consistent information. The methods described below have different performance and scalability characteristics. In general, to improve the performance and scalability, more sophisticated methods may be utilized.

One method for maintaining consistent topology and meta-model information is to have the information services 101 retain the only copy of the meta-models 251 and the topology 252. With this method the monitoring tools 105 may retrieve the topology 252 or the meta-models 251 each time they are needed. In this way the monitoring tools 105 always use the most up-to-date (i.e., consistent) version of the topology 252 or meta-models 251. However, this method could add unnecessary overhead and reduce the scalability of the monitoring environment 200, if the topology and meta-models do not change frequently.

An alternative method for maintaining consistent topology and meta-model information is as follows. The information service 101 maintains the original copy of the meta-models 251 and the topology 252, updating them as relevant events are received. When a monitoring tool 105 attaches to the monitoring environment 200, the monitoring tool 105 retrieves a copy of the topology 252 and of the meta-models 251 and caches them. A formal cache consistency protocol is then utilized to keep the cached copies up-to-date (i.e., consistent with the original copies maintained by the information service 101). Co-pending U.S. patent application Ser. No. 09/368,635 titled: "IMPROVING CONTENT CONSISTENCY IN A DATA ACCESS NETWORK SYSTEM", the disclosure of which is hereby incorporated herein by reference, described an exemplary scalable cache consistency mechanism that could be utilized. The overhead of this approach can be significantly less than the previously described method, if the topology 252 and the meta models 251 change less frequently than the monitoring tools 105 that use the topology and meta-models. The overhead can be further reduced in several ways. First, the monitoring tools 105 could retrieve only the relevant portions of the topology 252 and/or meta-models 251. For example, if monitoring tool 105A needs data only from monitoring source 244A, then it only requires the meta-model for metric model 202A, and not the meta-model for metric models 202B-C. Second, when a change occurs to the topology 252 or the meta-models 251, the information service 101 could push only a 'diff' (patch) to the monitoring tools 105, rather than all of the topology and/or meta-model information.

Another method for maintaining consistent topology and meta-model information is as follows. The information service 101 maintains the original copies of the meta-models 251 and the topology 252. When monitoring tools 105 initially attach to the monitoring environment 200, they retrieve the topology 252 and the meta-models 251 from a nearby peer. For example, when monitoring tool 105B attaches to the monitoring environment 200, it may retrieve the topology 252 and meta-models 251 from monitoring tool 105A. A peer-to-peer technology may be used to enable a new monitoring tool to identify other monitoring tools already attached to the monitoring environment 200, or the information service 101 may provide a list of peers that have a copy of the topology and meta-models the monitoring tool requires (in this case the monitoring tool initially contacts the information service 101 for the list, then contacts the peer directly to retrieve the topology 252 and the meta-models 251). By utilizing peer-to-peer techniques for distributing the topology 252 and meta-models 251, it reduces the overhead on the information service 101 and increases the scalability of the monitoring environment 200. Again, a formal consistency protocol may be used to keep the cached copies of the topology and meta-model information up-to-date. In this case, a different consistency policy may be desired than from the previous example, in order to reduce the overhead on the information service 101 when propagating changes to the topology 252 or the meta-models 251. The overhead can be further reduced using the enhancements described in the previous example.

Figure 3:
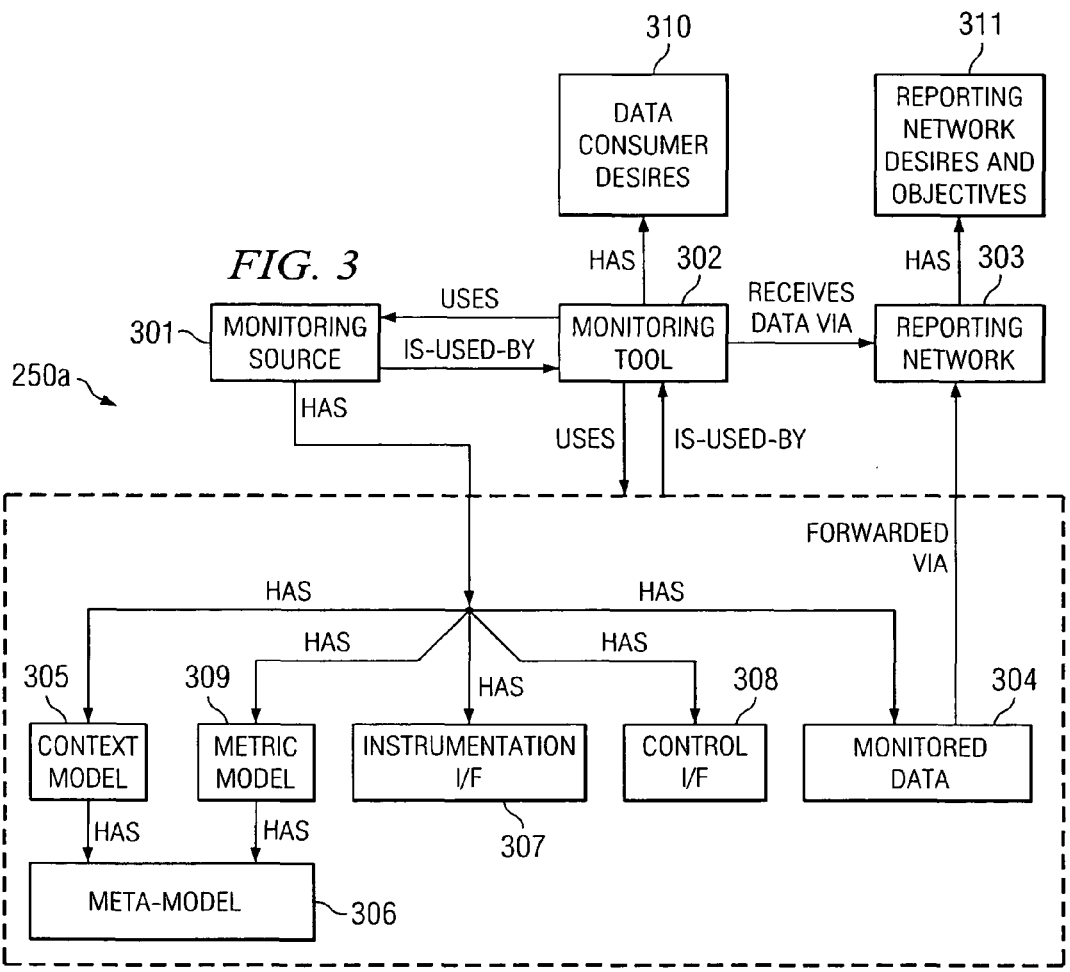
FIG. 3 shows an exemplary block diagram representing a machine-readable monitoring model according to one embodiment of the present invention.

FIG. 3 shows an exemplary block diagram representing a machine-readable monitoring model, labeled 250A, according to one embodiment of the present invention. Exemplary machine-readable monitoring model 250A comprises information identifying monitoring source(s) 301, monitoring tool(s) 302, reporting network 303, monitored data 304, context model(s) 305, meta-model(s) 306, instrumentation interface(s) 307, control interface(s) 308, metric model(s) 309, data consumer desires 310, reporting network desires and objectives 311, as well as the relationships therebetween. In the illustrated example, the monitoring model 250A identifies a monitoring source 301 that is used by a monitoring tool 302. Monitoring source 301 is defined in model 250A as having metric model 309; monitoring source has an instrumentation interface 307 and control interface 308. Monitoring model 250A further identifies that meta-model 306 defines the structure (e.g., syntax) for metric model 309. Context model 305 describes the context (meta-data that describes the purpose of a system, e.g., payroll, etc.) that may itself have a meta-model 306. In other words, context model 305 is machine-readable meta-data defining the purpose of a system. This information can be used by monitoring tools to better classify systems being monitored. In one embodiment, the methods used by monitoring tools for exploiting meta-models for metric-models can also be used by monitoring tools for exploiting meta-models for such meta-data.

As the exemplary monitoring system represented by monitoring model 250A changes from time-to-time, the monitoring model 250A also changes to accurately reflect the changed monitoring system. According to one example, a resource assignment service may cause the creation of a logical resource that is part of a monitored system (e.g., a payroll system). The new logical resource may have its model, meta-model, and meta-data registered with a new monitoring source not currently used by tools that require monitoring data about the monitored system. The new monitoring source may emit a change event to the information service that then, by matching context model meta-data 305, informs those monitoring tools interested in monitored components with corresponding meta-data 310, that a new logical resource has been created for the monitored environment. Tools interested may then discover the corresponding monitoring source and register for access to the data. As they do so, the reporting network may be reconfigured to provide the data and to continue to satisfy the overall desires and objectives of the reporting network 311, as described further in co-pending and commonly assigned U.S. patent application Ser. No. 11/158,776 titled "SYSTEM AND METHOD FOR AUTONOMOUSLY CONFIGURING A REPORTING NETWORK".

Such a monitoring model 250 may be provided in machine-readable form, as the below example illustrates. The following example provides:

the meta-model for the metric model;
the corresponding metric model;
an exemplary meta-model for the meta-data; and
an exemplary instance of this meta-data meta-model, i.e., context model.

The examples are given in terms of the Management Object Formal (MOF), which is a known language (see htttp://www.dmtf.org/education/mof).

Exemplary Meta-Data Model:

```
Class QM BaseMetric Group
{
    [key] uint32 id;
    String name;
    String metrics[ ];
}
    class QM BaseMetric
{
    [key] uint32 id;
    String name;
    RecordDefinition REF record;
    DataSourceDescription REF data;
};
class sequencedMetric : QM BaseMetric
{
    DateTime start;
    sint32 offset;      //DateTime should work for intervals, but it
    sint32duration;   //doesn't for snia, use sint32 instead
};
class varIntervalSeqMetric : sequencedMetric
{
    Attribute REF seqAttr;         //sequence order
};
class RecordDefinition
{
    [key] uint32 id;
    String name;
    String attrSet[ ]
};
    [key] String name;
    String type;
        [values {"percent", "bytes", "bps", "pps", "cm", ""/*...*/}]
    String unit;
};
class DataSourceDescription
{
    [key] uint32 id;
        [values {"RDB", "logfiles" /* ... */}]
    String type;
    String system;
    String dataReference;
    String accessInformation;
};
```

An Exemplary Model:

```
Instance of QM BaseMetric Group
{
    Id-1111;
    name="logs";
    metrics="2434": // web log entry metric
}
Instance of VarintervalSeqMetric
{
    id="2434";
    name=web log entry";
    record="web log record";
    data="web log data source";
    start="2004-12-01 00:00:00";
    seqAttr="time";
}
Instance of RecordDefinition
{
id="5453";
name="web log record";
attrSet="time, URL";
}
Instance of Attribute
{
name="time"
```

-continued

```
    type="datetime";
    unit="*";
}
Instance Attribute
{
    name="URL";
    type="String";
    unit="*";
}
Instance of DataSourceDescription
{
id="5678";
type="unixfile";
dataReference="/var/log/httpd.log"
```

Exemplary Context Meta-Model:

```
// describes a component in the monitored environment
Class Entity
{
    string id; // must be unique in namespace
    string name;
};
// describes a computer system in the monitored environment
class ComputeServer : Entity
{
[Description (
        "Size of total physical memory in the machine. "),
    Units ("megaBytes") ]
uint64 PhysicalMemorySize;
[Description (
        "Number of processors in this machine. ")]
uint16 NumberOfProcessors;
[Description (
        "Maximum speed of processors in this machine. "),
Units (MHz") ]
uint32 ProcessorsSpeed;
};
class ContextEntityRelationship
}
    Entity REF Entity;
    QM BaseMetricGroup REF Metrics;
};
```

Exemplary Context Model:

```
Instance of ComputeServer
{
    id-1944;
    name="plex.hpl.hp.com";
    PhysicalMemorySize=1024;
    NumberOfProcessors=16;
};
Instance of ComplexEntityRelationship
{
    Entity=1944; // plex.hpl.hp.com
    Metrics=1111; // metric group;
};
```

For example, in certain embodiments a data consumer 105 can, by perusing machine-readable monitoring model 250, discover the structure and relationships in the monitored environments 102. The consumers 105 can discover which metric models 202 are available from data collection agents 103 for each system in the monitored environment 102. The data consumers 105 can be made aware of changes in such relationships or availabilities via events, for example.

As an example, suppose that monitored component 204C (e.g., an application) migrates from monitored environment 102C (e.g., a first data center) to monitored environment 102E (e.g., a second data center). In this case, monitoring source 244C will begin collecting monitoring data for such monitored component 204C and monitoring tools 105B and 105C may access such monitoring data to monitor the operation of monitored component 204C. At first, the reporting network forwards data from monitoring source 244B to monitoring tools 105B and 105C. The departure of monitored component 204C from the relationship with data collection agent 103C causes a configuration change event that gets propagated to tools 105B and 105C. Similarly, the migration of monitored component 204C causes the new relationship between such monitored component 204C and monitoring source 244C. It causes a configuration change event that gets propagated to tools 105B and 105C. While the change event that signals the end of the monitoring data stream from monitored environment 102C may automatically terminate the need for reporting service support, and hence a reconfiguration, by the reporting network to transfer data about monitored component 204C to monitoring tools 105B and 105C, the change event that signals the new relationship with monitoring source 244C triggers the tools 105B and 105C to register, with the information service, for access to data about monitored component 204C via monitoring source 244C. This may cause changes to the reporting network to enable the flow of monitoring data from the monitored component's new monitoring environment 102E. The registration of monitoring data requirements may be stored by the information service in the monitoring model. Furthermore, it may well be that the metric model for instrumentation for monitored component 204C changes as a result of the migration. As tools 105B and 105C register for access to data about monitored component 204C, they follow the same processes as described earlier herein to access the data in a model-driven manner.

Figure 4:
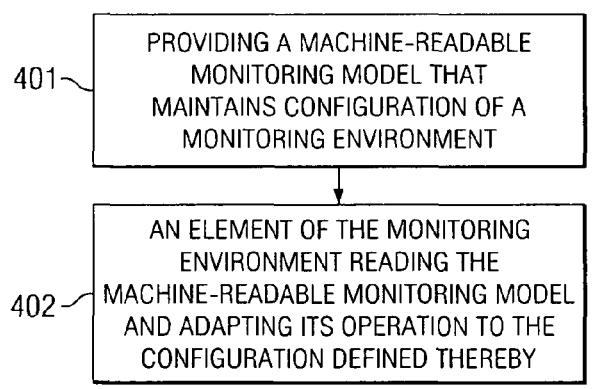
FIG. 4 shows an exemplary operational flow according to certain embodiments of the present invention.

FIG. 4 shows an exemplary operational flow according to certain embodiments of the present invention. In operational block 401, a machine-readable monitoring model is provided that maintains configuration of a monitoring environment. That is, in certain embodiments, the monitoring model maintains the configuration even as the configuration changes from time-to-time. For instance, responsive to a change occurring in the monitoring environment's configuration, the machine-readable monitoring model updates to reflect the change. In operational block 402, an element of the monitoring environment reads the machine-readable monitoring model and adapts its operation to the configuration defined thereby.

In view of the above, in accordance with certain embodiments of the present invention, data consumers 105 are able to access monitoring data about a diversity of physical and logical systems that may continuously evolve over time. Data consumers 105 are able to discover what monitoring data is available, are informed when the kinds of data or systems change, are presented with monitoring data using common or standard metric names, are presented with structural information using common or standard semantics (e.g., meta-data), and are presented with monitoring data in a manner that can be accessed conveniently despite complex changes in the monitored environment and/or reporting services. The reporting services 104 provide management capabilities that act to support the requirements of data consumers 105 while satisfying overall desires and objectives (e.g. overhead, reliability, flexibility with respect to change and virtualized infrastructures, value added services such as prioritizing the forwarding of data) for monitoring as a whole 254. This supports the efficient use of resources and/or the reliable delivery of monitoring data subject to overall objectives.

What is claimed is:

1. A method comprising:
providing a machine-readable monitoring model that describes a configuration of a monitoring environment, the monitoring model describing a metric model identifying which monitoring data is collected at a data collection agent; and
an element of the monitoring environment reading said machine-readable monitoring model and adapting its operation to said configuration defined thereby, including adapting its operation to the metric model.

2. The method of claim 1 wherein said configuration comprises:
information affecting the ability of a monitoring tool to be capable of receiving and understanding monitoring data that the monitoring tool desires for monitored components.

3. The method of claim 1 wherein said configuration comprises:
a topology of the monitoring environment.

4. The method of claim 1 wherein said machine-readable monitoring model comprises:
at least one meta-model that defines a structure of how information is represented in at least one data model;
information defining topology of the monitoring environment;
information specifying data consumer desires; and
information specifying reporting network desires.

5. The method of claim 1 wherein said providing comprises:
making said machine-readable monitoring model accessible by said element of the monitoring environment.

6. The method of claim 1 wherein said element of the monitoring environment comprises at least one of the following:
monitoring tool consuming monitoring data collected for a monitored component;
reporting network; and
monitoring source.

7. A method comprising:
providing a machine-readable monitoring model that defines configuration of a monitoring environment;
responsive to a change occurring in said monitoring environment's configuration, said machine-readable monitoring model updating to reflect said change; and
an element of said monitoring environment reading said machine-readable model and autonomously adapting its operation to the changed configuration.

8. The method of claim 7 wherein said configuration comprises:
information affecting the ability of a monitoring tool to be capable of receiving and understanding monitoring data that the monitoring tool desires for monitored components.

9. The method of claim 7 wherein said configuration comprises:
a metric model according to which monitoring data is collected at a data collection agent; and topology of the monitoring environment.

10. The method of claim 7 wherein said machine-readable monitoring model comprises:
at least one meta-model that defines a structure of how information is represented in at least one data model;
information defining topology of the monitoring environment;
information specifying data consumer desires; and
information specifying reporting network desires.

11. The method of claim 7 wherein said providing comprises:
making said machine-readable monitoring model accessible by said element of the monitoring environment.

12. The method of claim 7 wherein said element of the monitoring environment comprises at least one of the following:
monitoring tool consuming monitoring data collected for a monitored component;
reporting network; and
monitoring source.

13. A system comprising:
dynamically changing monitored environment comprising at least one monitored component and instrumentation for collecting monitored data about said at least one monitored component;
model-driven monitoring environment comprising at least one data consumer for receiving said monitored data and a reporting service for reporting said monitored data to said at least one data consumer;
data collection agent exposing said instrumentation to said model-driven monitoring architecture; and
information services comprising a machine-readable monitoring model that defines configuration of said monitoring environment and the configuration including a metric model identifying which monitoring data is collected by the data collection agent, wherein said information services dynamically changes said machine-readable model to change the configuration of said monitoring environment responsive to changes in the monitored environment.

14. The system of claim 13 wherein said information services is communicatively accessible to said at least one data consumer.

15. The system of claim 13 wherein said information services is communicatively accessible to said reporting service.

16. The system of claim 13 wherein said machine-readable monitoring model comprises:
at least one meta-model that defines a structure of how information is represented in at least one data model;
information defining topology of the monitoring environment;
information specifying data consumer desires; and
information specifying reporting network desires.

17. An article comprising a non-transitory computer readable storage medium storing instructions that when executed by at least one processor cause said at least one processor to:
provide information services logic that is communicatively accessible by at least one component of a monitoring environment, said information services logic comprising a machine-readable monitoring model defining configuration of said monitoring environment, the monitoring model describing a metric model identifying which monitoring data is collected at a data collection agent; and
wherein said information services logic is operable to autonomously change said machine-readable monitoring model to specify a proper configuration of said monitoring environment responsive to changes in a monitored environment.

18. The article of claim 17 wherein said machine-readable monitoring model comprises:
at least one meta-model that defines a structure of how information is represented in at least one data model;
information defining topology of the monitoring environment;
information specifying data consumer desires; and
information specifying reporting network desires.

19. The article of claim 17 wherein said configuration comprises:
information affecting the ability of a monitoring tool to be capable of receiving and understanding monitoring data that the monitoring tool desires for monitored components in said monitored environment.

20. The article of claim 17 wherein said configuration comprises: information defining topology of the monitoring environment.

21. A system comprising:
dynamically changing monitored environment comprising at least one monitored component and instrumentation for collecting monitored data about said at least one monitored component;
model-driven monitoring environment comprising at least one data consumer for receiving said monitored data and a reporting service for reporting said monitored data to said at least one data consumer;
data collection agent exposing said instrumentation to said model-driven monitoring architecture; and
information services comprising a machine-readable monitoring model that defines configuration of said monitoring environment, wherein said information services dynamically changes said machine-readable model to change the configuration of said monitoring environment responsive to changes in the monitored environment, wherein said machine-readable monitoring model comprises:
at least one meta-model that defines a structure of how information is represented in at least one data model;
information defining topology of the monitoring environment;
information specifying data consumer desires; and
information specifying reporting network desires;
at least one tool to request monitoring data from one or more monitoring data sources; and
a reporting network to connect and disconnect with said at least one tool, wherein said tool is adapted to register and deregister with the information services.

* * * * *

UNITED STATES PATENT AND TRADEMARK OFFICE
CERTIFICATE OF CORRECTION

PATENT NO. : 8,379,538 B2  Page 1 of 1
APPLICATION NO. : 11/158756
DATED : February 19, 2013
INVENTOR(S) : Jerome Rolia et al.

It is certified that error appears in the above-identified patent and that said Letters Patent is hereby corrected as shown below:

In the Specifications:

In column 1, lines 8-9, delete "158,776 entiled" and insert -- 11/158,776 entitled --, therefor.

In column 1, line 13, delete "PROGRAMMATIC ALLY" and insert -- PROGRAMMATICALLY --, therefor.

In the Claims:

In column 17, line 15, in Claim 13, delete "!east" and insert -- least --, therefor.

Signed and Sealed this
Twenty-eighth Day of May, 2013

Teresa Stanek Rea
*Acting Director of the United States Patent and Trademark Office*